Aug. 28, 1923.
P. SAMAIN
1,466,412
AUTOMATIC HYDRAULIC APPARATUS
Filed May 22, 1919
5 Sheets-Sheet 3
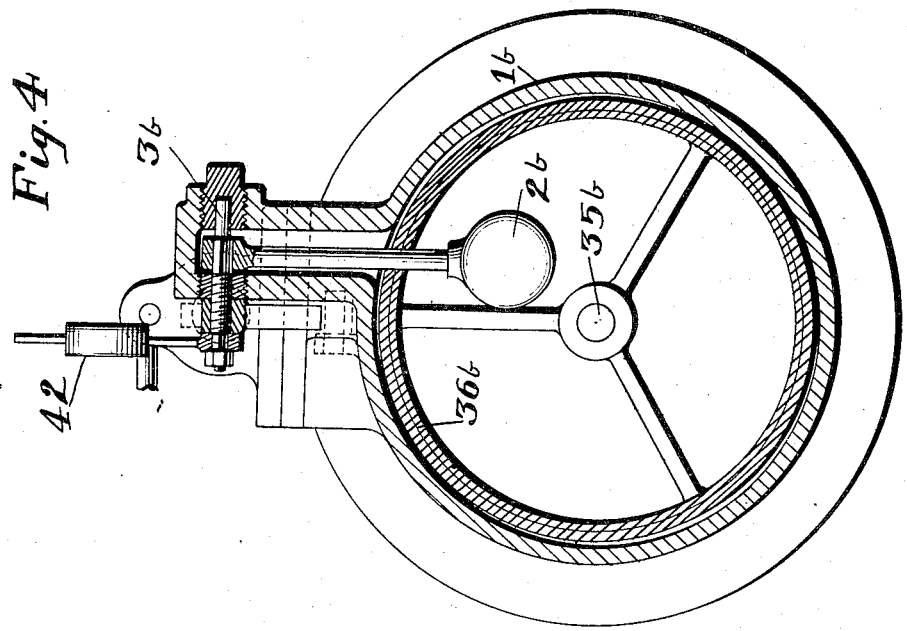
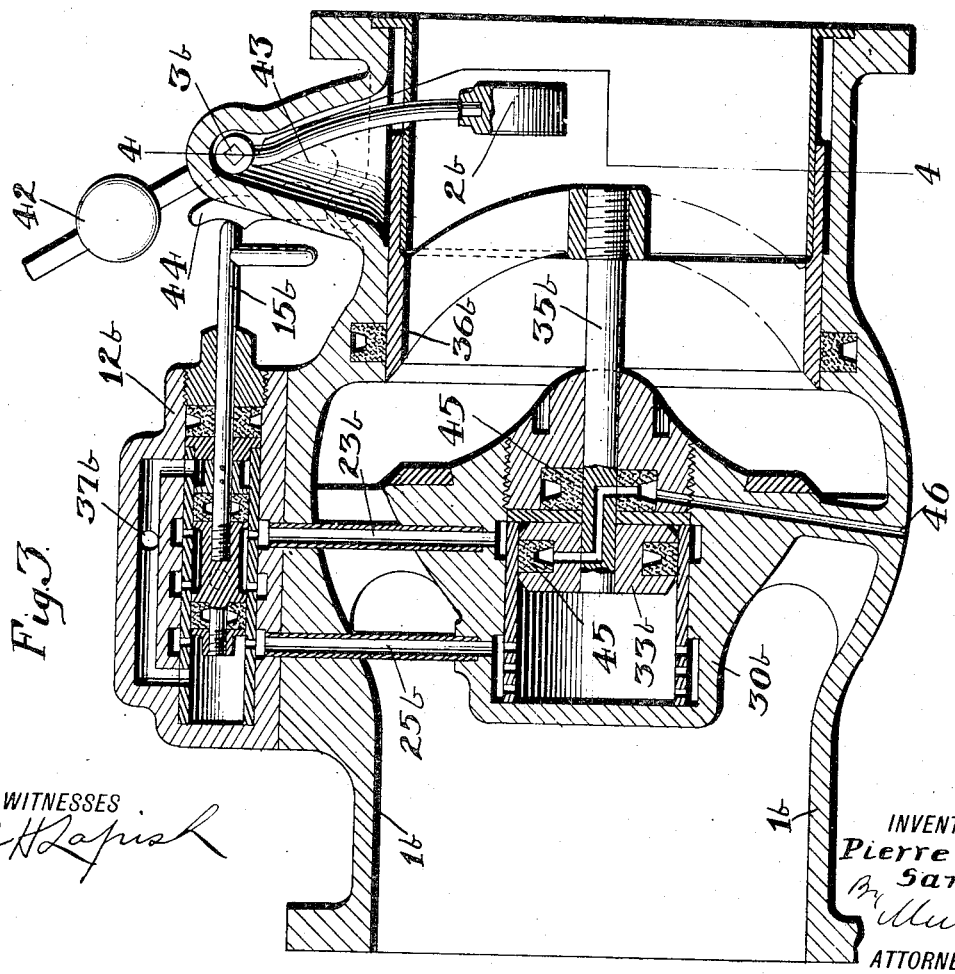
INVENTOR
Pierre Samain
ATTORNEYS

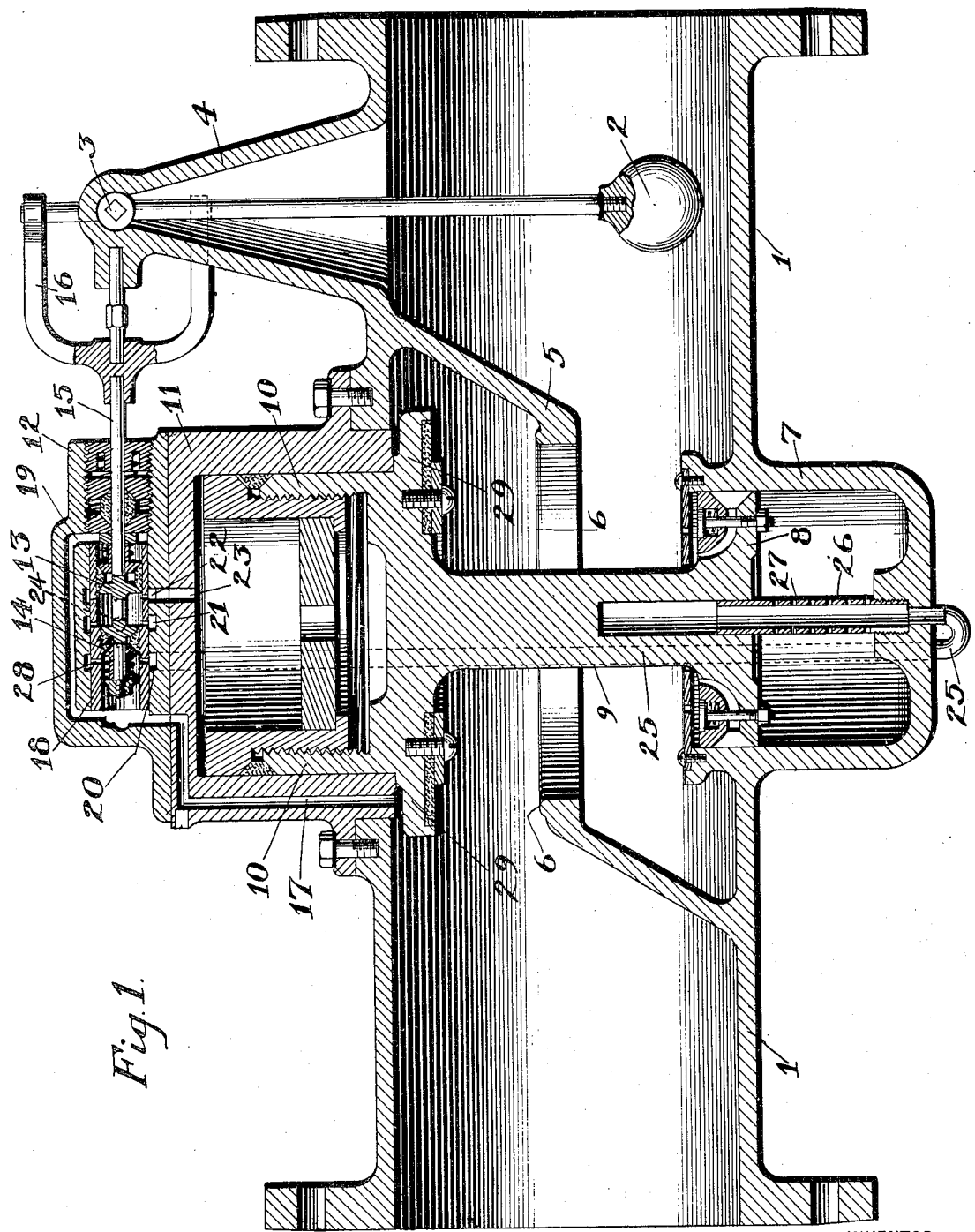

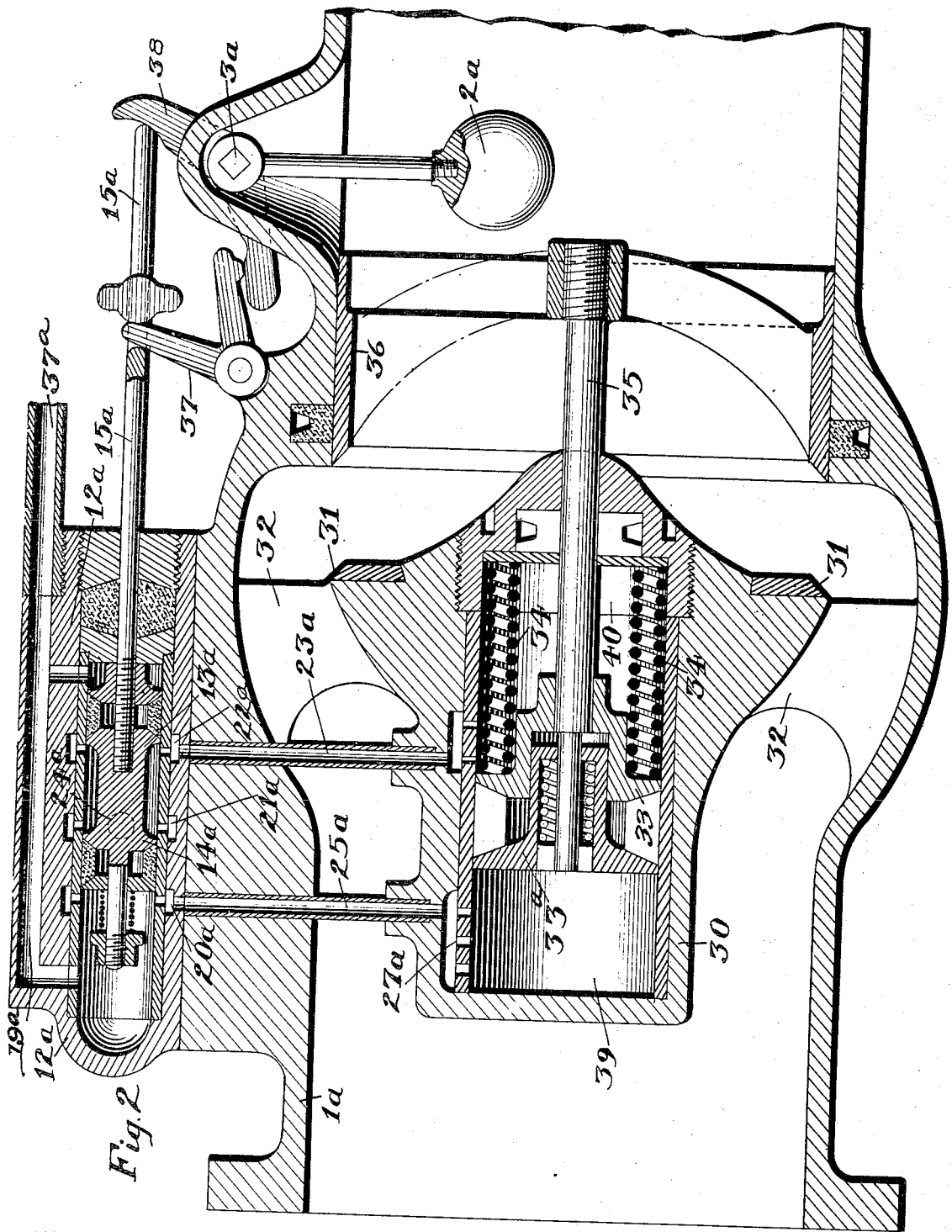

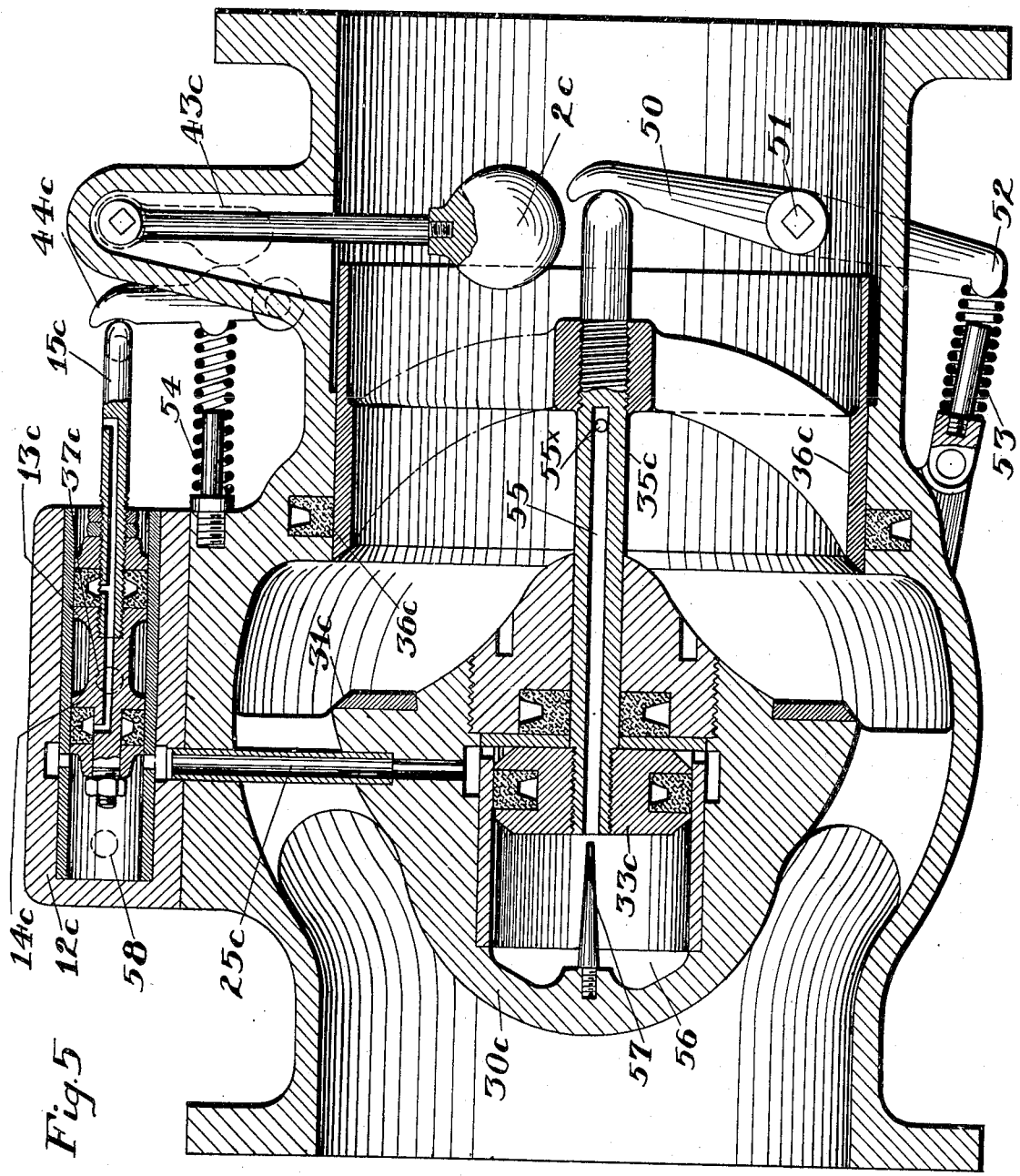

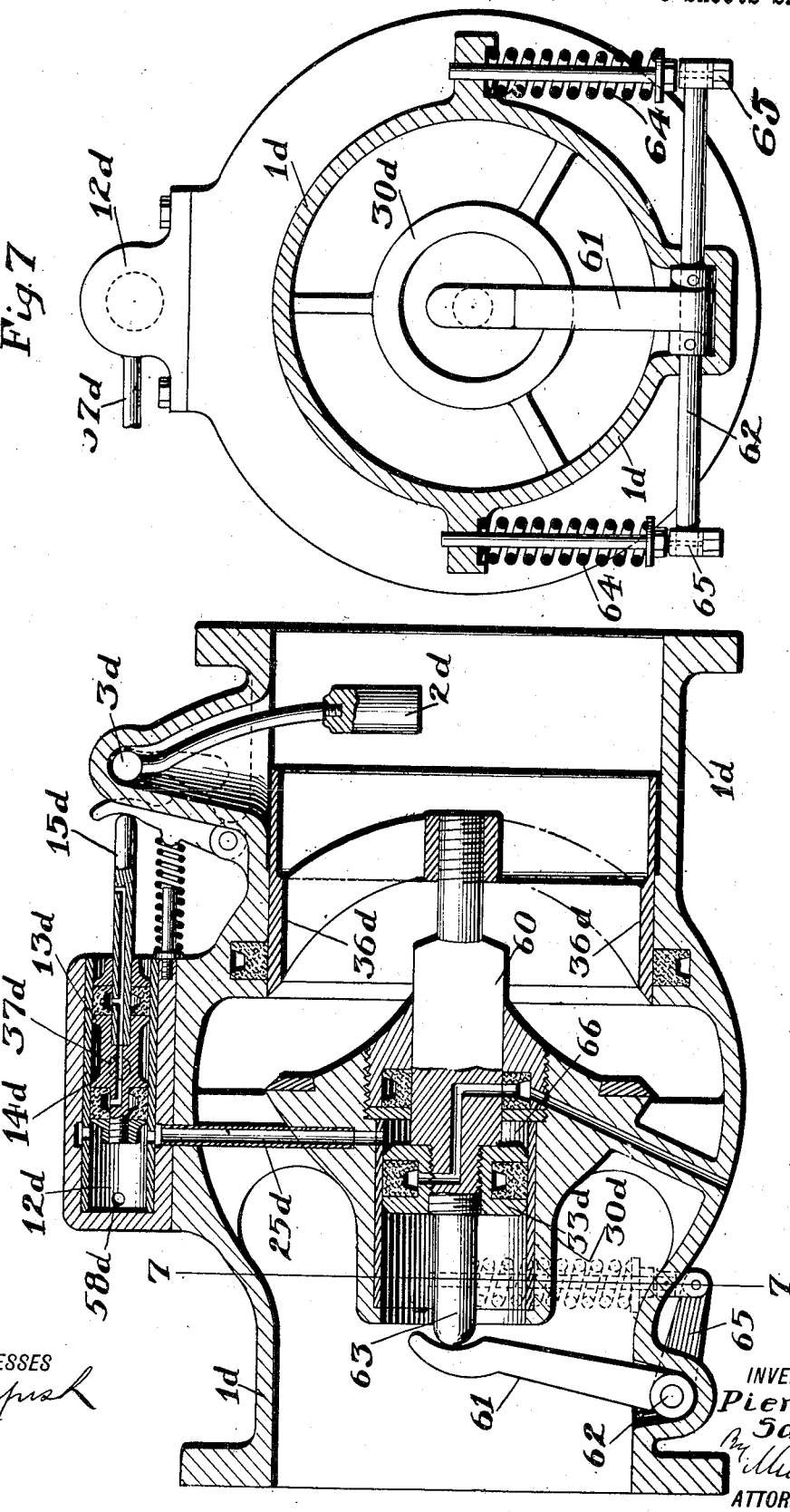

Patented Aug. 28, 1923.

1,466,412

UNITED STATES PATENT OFFICE.

PIERRE SAMAIN, OF CUSY, HAUTE-SAVOIE, FRANCE.

AUTOMATIC HYDRAULIC APPARATUS.

Application filed May 22, 1919. Serial No. 298,997.

(GRANTED UNDER THE PROVISIONS OF THE ACT OF MARCH 3, 1921, 41 STAT. L., 1913.)

*To all whom it may concern:*

Be it known that I, PIERRE SAMAIN, a citizen of France, residing at Cusy, Haute-Savoie, France, have invented certain new and useful Improvements in Automatic Hydraulic Apparatus (for which I have filed application in France Oct. 19, 1917, Patent Number 488,748), of which the following is a specification.

My invention relates to automatic hydraulic apparatus and it consists in the combinations, constructions and arrangements herein described and claimed.

An object of the present invention is to provide a device by means of which the pressure exerted by a liquid in a conduit may be automatically controlled.

A further object of my invention is to provide a device which will operate to automatically close the conduit in case the latter should break.

A further object of my invention is to provide a device for automatically closing a conduit in which use is made of a pivoted arm or pendulum so disposed that the rush of liquid escaping through the break will cause the displacement of the pendulum and the consequent operation of a valve to close the conduit, whether the current of fluid flows in one direction or the other.

Other objects and advantages will appear in the following specification and the novel features of the invention will be particularly pointed out in the appended claims.

My invention is illustrated in the accompanying drawings forming part of this application, in which:

Figure 1 is a central sectional view through a conduit equipped with one form of my improved automatic controlling and closing apparatus, Figure 2 is a sectional view showing a modified form of the device, Figure 3 is a sectional view of a further modified form in which the controlling means is operated by a fluid current in one direction only, Figure 4 is a sectional view on the line 4—4 of Figure 3, Figure 5 is a sectional view of another modified form of the device, Figure 6 is a sectional view of another modified form of the device, and Figure 7 is a section along the line 7—7 of Figure 6, the apparatus shown in Figures 6 and 7 being particularly designed for use with hydraulic turbines.

One of the main features of the invention as stated, is to provide a device which will act automatically to close the conduit in case the latter is broken. The means for accomplishing this in each instance includes a pivoted arm or pendulum which is suspended on the interior of the conduit and which acts in such a manner that when the conduit is broken the rush of current which pours from the breach or break carries along with it one end of the pendulum, that is to say, it causes the end to swing thereby operating a valve which in turn causes the closing of the conduit.

Referring now particularly to Figure 1, I have shown a conduit 1 having a pivoted arm or pendulum 2 suspended at 3 in a cone-shaped extension 4. In this particular instance the interior of the conduit is provided with a partition 5 having a circular valve seat 6. On one side of the conduit is a casing 7 which in the present instance is in cylindrical form and which contains a piston 8, the latter being connected by a piston rod 9 with a piston or plunger 10 disposed in a cylinder 11 on the opposite side of the conduit. A valve casing 12 is carried by the cylinder 11 and is provided with two piston valves 13 and 14 respectively, which are on a common valve stem 15. The latter is secured to a yoke 16 whose arms are extended on each side of the pivot 3 of the pendulum. It will be observed that the pendulum is extended on beyond this pivot and the ends of the yoke 16 are bent laterally in such a manner that if the pendulum should be moved to the right in Figure 1, the lower arm will be engaged and will therefore move the yoke to the right, while if the pendulum should be moved to the left, the upper arm will be engaged and will be moved to the right. It will be apparent therefore that any movement of the pendulum out of its vertical position will cause a movement of the yoke and the valve stem 15 to the right.

Referring again to Figure 1 it will be seen that a passageway 17 leads from the conduit 1 to the interior of the valve casing 12. The piston valves 13 and 14 are disposed in a sleeve 18 which is open at both ends to the flow of fluid from the conduit 1, the two ends of the sleeve being in communication by means of a by-pass 19. The valve casing contains three annular passages 20, 21 and 22 respectively, the latter passage being in communication with the interior of the piston 10 by means of a passage 23. An outlet port 24, shown in dotted lines in Figure 1, communicates with the central annular passage 21. The annular passage 20 communicates by means of an exterior pipe 25 with the bottom of the casing 7. The latter has a central tube 26 having perforations 27 whose purpose will be explained later.

From the foregoing description of the various parts of the device, the operation thereof may be readily understood. The position of the parts as shown in Figure 1, is the normal condition in which the free flow of the fluid through the conduit is permitted. Should a break occur on either side of the conduit section containing the automatic closing apparatus, there will be a rush of fluid through the break, thereby swinging the pendulum 2 and tending to cut off the flow of fluid through the conduit section in the manner hereinafter described. In the normal position of the parts, that is to say, in the position shown in Figure 1, fluid will enter through the passageway 17 through the end of the sleeve 18 and by the registering port 28 in the sleeve will pass through the pipe 25 into the tube 26 and through the openings therein into the interior of the casing 7, thereby forcing the piston 8 into the position shown in the drawing, and thus keeping the valve 29 which is formed on the bottom of the piston 10 open so as to permit a free flow of the fluid through the partition 5. Any fluid which may have been contained within the interior of the piston 10 will find its way out through the passages 23 and 22, passage 21 and port 24.

Should a break occur the rush of fluid in either direction, which causes a movement of the pendulum, operates to force the yoke 16 to the left, thereby moving the piston valves 13 and 14 so as to cut off communication between the pipe 25 and the passage 17 and to establish communication between the interior of the piston 10 and the passage 17 through the medium of the passages 19, 22 and 23. The movement of the piston 14 to the left will effect communication between the pipe 25 and the outlet port 24. Under these conditions, the piston 10 will be forced downwardly and the fluid contained in the receptacle 7 will pass backwardly through the pipe 25 and through the passages 20 and 24. This will cause the valve 29 to be seated on the seat 6, thus stopping the flow through the conduit.

The apparatus may be set manually by pulling the yoke 16 over to the right, thereby shifting the piston valves 13 and 14 and again establishing communication between the pipe 25 and the passage 17 whereupon the fluid will again enter the casing 7, forcing the piston 8 upwardly while any fluid in the interior of the piston 10 will find its way out through the port 24 in the manner already described.

The apparatus also serves to regulate the pressure within the conduit. Consider the part as shown in Figure 1. If the pressure within the conduit should diminish below a predetermined amount, then the piston 8, which is supported by this pressure will descend, forcing the fluid in the casing 7 backwardly through the pipe 25 and permitting the valve 29 to close the opening in the partition 5 until such time as the pressure is again sufficient to open it. I may use in connection with the device shown in Figure 1 a compensating spring, not shown in the figure, such as that hereinafter described in connection with certain of the modified forms.

It will be seen from the foregoing description that the device serves not only to automatically close the conduit in case of a break, but also to regulate the pressure therein. The valve 29 which closes the conduit is operated positively but is prevented from operating too quickly by means of the fact that the small openings 27 in the tube 26 permit the passage of the fluid therethrough relatively slowly, that is to say, they prevent a sudden rush of the fluid which would tend to close the valve or to open it too quickly.

In Figure 2 I have shown a modified form of the device which is adapted for spouts having cylindrical valves. In this form of the device the conduit section 1$^a$ has a pendulum 2$^a$ which is pivoted at 3$^a$. A valve casing 30 having a seat 31 is disposed centrally of the conduit by means of a spider 32. In the interior of the valve casing is a piston 33 which is acted on by springs 34. The piston includes a buffer 33$^a$ to absorb the impact of the hydrostatic pressure on the head of the piston. The piston rod 35 is connected with a tubular valve 36. The fluid for actuating the piston 33 is introduced into the valve casing 12$^a$ by means of a pipe 37$^a$ which may be connected with the conduit at any suitable point, not shown. The valve stem 15$^a$ of the valves 13$^a$ and 14$^a$ is connected up with the levers 37 and 38 in such a manner that the movement of the pendulum 2$^a$ in either direction will cause a movement of the piston rod 15$^a$ to the left in Figure 2. The piston 33 divides the valve casing into two compartments 39 and 40. The normal position of the apparatus is that shown in the figure. The valve is kept in its open position by the fluid which passes through the by-pass 19$^a$ into the interior of the valve casing, thence through the passages 20ª, 25ª and 27ª. If for any reason the pressure should diminish, the springs 34 will push the piston toward the left in Figure 2, thereby moving the valve 36 toward its seat, thus tending to close the conduit and to restore the pressure.

If the conduit should break, the movement of the pendulum 2ª in either direction causes the shifting of the valves 13ª and 14ª so as to admit fluid pressure into the valve casing and then through the passages and 23ª into the compartment 40 behind the piston, while at the same time the compartment 39 is placed in communication with the outlet shown in dotted lines at 24ª. The pressure of the fluid aided by the springs thus results in the closing of the valve 36 to stop the flow.

In this form of the device, as in that shown in Figure 1, the conduit is closed by a break on either side of the apparatus with the fluid flowing in either direction through the break. The apparatus may be reset by moving the valves 13ª and 14ª to their normal position shown in Figure 2 manually.

In Figures 3 and 4, I have shown a form of the device which is constructed especially for conduits having a flow in only one direction, for example, those used for oil pipe line. In this form of the device the compensating springs are omitted. The pendulum 2ᵇ is pivotally mounted at 3ᵇ and is extended on to provide a support for the counterbalance 42 which is adjustable so as to cause the pendulum to operate at the desired velocity of flow of the fluid. In this form of the device a lever 43 engages the lever 44 which bears on the end of the valve stem 15ᵇ to move it toward the left in the figure. The controlling fluid enters the valve casing 12ᵇ through the port 37ᵇ and the apparatus is operated in the same manner as that already described in connection with Figure 2. It will be observed, however, that the packing glands 45 are hollow and the interior of these glands is connected by means of passages 46 with the outer atmosphere. This insures a perfect seating for the glands and it also obviates any danger of leaking through faulty construction.

In that form of the apparatus set forth in Figure 5 the closing of the conduit is designed to be effected by a movement of the pendulum in one direction only. The rod 35ᶜ which is connected with the piston 33ᶜ is extended and is pressed upon by the end of a lever 50 which is pivoted at 51 and whose lower end 52 is pressed on by springs such as that shown at 53. The lever 44ᶜ which is operated by the pendulum 2ᶜ is pressed upon by the spring 54. The figure shows the valve 36ᶜ open. When the break occurs in the conduit the valve 36ᶜ is closed. This valve is normally kept open by the pressure exerted by the fluid which enters from the conduit through the port 55 and passes through the passageway 55 into the compartment 56 thus holding the piston 33ᶜ in the position shown in the drawing. A break in the conduit will cause the rush of fluid to swing the pendulum so as to push the valve rod 15ᶜ with its pistons 13ᶜ and 14ᶜ into such position as to establish communication between the inlet 37ᶜ and the pipe 25ᶜ leading to the chamber 56, but at the rear side of the piston. This pressure in addition to that of the springs 53 causes the closing of the valve 36ᶜ.

In the normal condition of the apparatus when the pressure is decreased beyond a predetermined limit the springs 53 cause a closing of the valve 36. Instead of using small openings to prevent a sudden closing of the valve, I make use of a cone-shaped closure 57 which enters the end of the passage 55 so as to prevent a sudden rush of fluid therethrough. In the drawing, the packing glands of the piston valves 13ᶜ and 14ᶜ are shown as being in communication with the outer atmosphere and the interior of the valve casing 12ᶜ is also in communication with the outer atmosphere through the medium of the port 58. The device is regulated by means of the spring 54 whose tension may be adjusted so as to cause the apparatus to operate automatically at a predetermined pressure. After the device has operated automatically to effect the closure of the conduit and the pressure returns to normal, the pendulum is brought back to its normal position by means of the spring 54 while the valves may be reset manually as already explained.

In the form of the device shown in Figure 6 the valve 36ᵈ is connected with a plunger 60 which extends into the valve casing 30ᵈ and which has attached to it the piston 33ᵈ. The piston 33ᵈ and the plunger 60 are acted upon by the pressure in opposite directions and this differential pressure in conjunction with other means, controls the movement of the valve 36ᵈ. As will be seen from Figures 6 and 7, an arm 61 is pivotally mounted at 62 and bears on the extension 63 of the piston rod. Springs 64 press on arms 65 attached to the pivot rod 62 thus tending to hold the piston 33ᵈ in the position shown in the figure. In this form of the device the chamber 66 is in communication with the atmosphere through the medium of the pipe 25ᵈ, the interior of the valve casing 12ᵈ and the port 58ᵈ.

If the pressure within the conduit begins to diminish then the plunger 60 and the piston 33ᵈ travel toward the left thus tending to close the valve 36ᵈ until equilibrium is established. In case of a break in the conduit the valves 13ᵈ and 14ᵈ are moved to connect the pipe 25ᵈ with the inlet 37ᵈ so as to admit fluid pressure behind the piston 33ᵈ thus closing the valves.

I claim:

1. The combination with a conduit, of a closure disposed therein, said closure consisting of a tubular valve, a piston for controlling the valve, springs normally engaging the piston to force the latter into its closing position, hydrostatic means for moving the piston in either direction, and a pendulum disposed within the conduit for controlling said hydrostatic means when the pendulum is moved in either direction.

2. An automatic valve having a piston with a conduit closure, a valve to control the passage of fluid to both sides of the piston from the conduit which is to be closed, and means situated in the conduit normally holding the valve to admit fluid to one side of the piston and hold the closure open, but adapted to be moved by an excessive fluid current in either direction, to shift the valve to admit fluid to the other side of the piston and shut the closure.

3. The combination of a valve to be shifted in one direction by means which is actuated when a pendulum is swung by a fluid current in any direction, and means which is then shifted to shut a connected closure, by fluid diverted by said valve when shifted.

4. An automatic valve comprising a casing, a piston with associated closure means, a valve which controls the passage of fluid to both sides of the piston from a conduit in communication with the valve casing, and a pendulum adapted to sway in either of two directions when the conduit breaks, to open the valve to one side of the piston and thereby shut the closure means.

5. An automatic valve comprising a casing, a piston with associated closure means, a valve with a plurality of ducts through which it controls the passage of fluid to both sides of the piston from a conduit in communication with the valve casing, and a pendulum adapted to sway in either of two directions upon a sudden rush of fluid in the conduit, to open the valve to one duct and thereby actuate the piston to shut the closure.

6. An automatic valve comprising a casing, a cylinder supported in the channel of said casing, having a piston with a closure situated in the casing, a valve normally in position to admit fluid from a conduit into one of two passages crossing the channel to the cylinder, and a pendulum in connection with the valve so positioned as to sway by excessive fluid current in either direction through the casing to shift the valve and admit the fluid to the other passage.

PIERRE SAMAIN.